United States Patent
La Roe

[15] 3,677,506
[45] July 18, 1972

[54] STORE RACK HOOK ASSEMBLY

[72] Inventor: Emmett T. La Roe, Los Angeles, Calif.
[73] Assignee: McDonnel Douglas Corporation
[22] Filed: Nov. 23, 1970
[21] Appl. No.: 91,930

[52] U.S. Cl. ............................................244/137, 294/83
[51] Int. Cl. .......................................................B64c 1/22
[58] Field of Search .............294/83 R, 83 A, 83 AA, 83 AB, 294/83 AE, 82, 84; 244/137, 118

[56] References Cited

UNITED STATES PATENTS

| | | | |
|---|---|---|---|
| 3,598,341 | 8/1971 | La Roe | 244/137 |
| 2,490,558 | 12/1949 | Sullivan | 294/83 A |
| 2,832,632 | 4/1958 | Johnson | 294/83 AE |

Primary Examiner—Richard E. Aegerter
Attorney—Walter J. Jason, Donald L. Royer and George W. Finch

[57] ABSTRACT

A hook assembly for supporting a bomb or other type store to a carrying vehicle such as an aircraft. The store hook of the assembly is supported at pivots on opposite sides of its store lug engaging portion to distribute the load applied thereto. The assembly includes a cam which when rotated allows movement of one of the hook supports so that the hook can rotate to disengage itself from the store lug.

13 Claims, 4 Drawing Figures

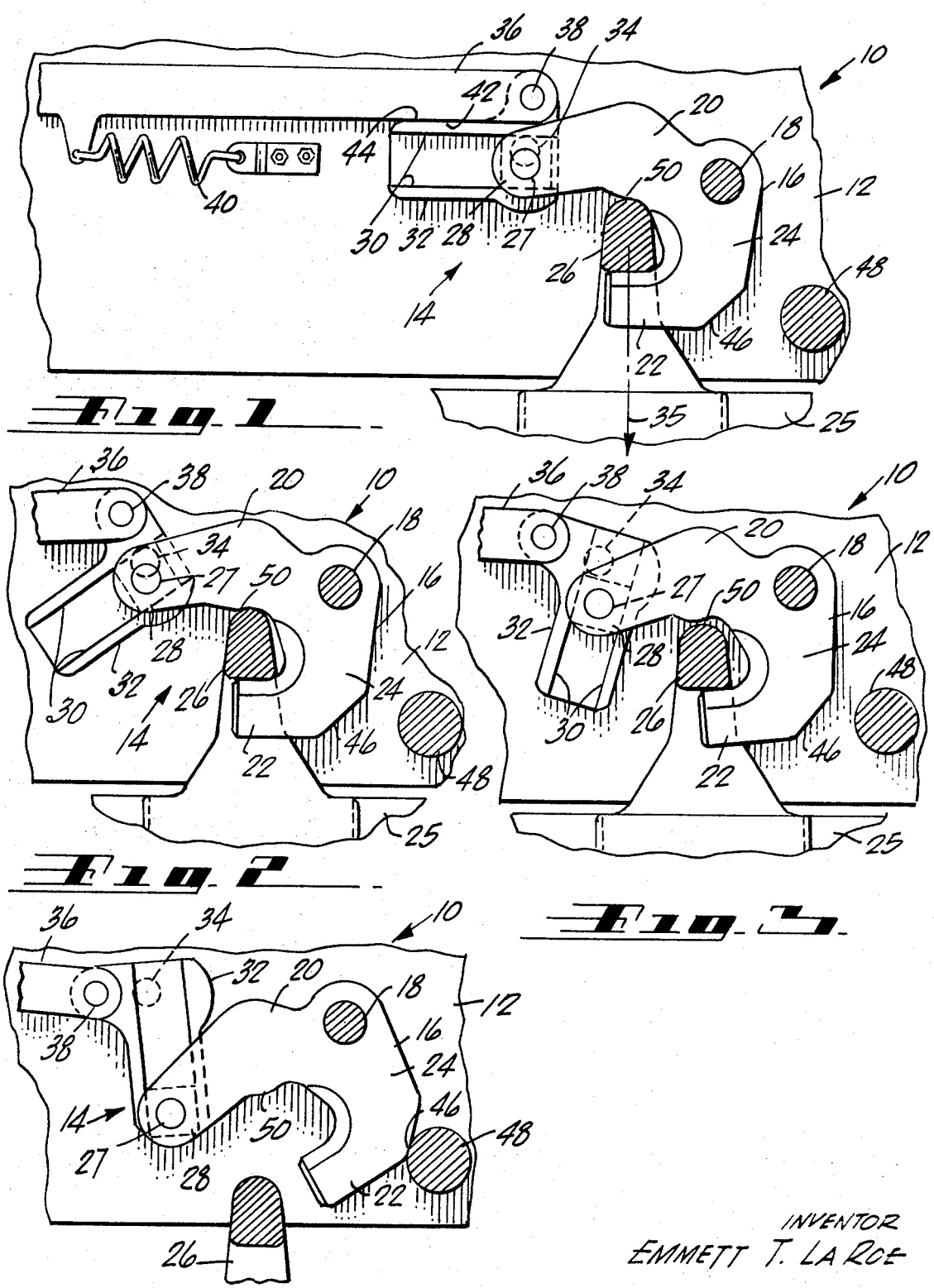

STORE RACK HOOK ASSEMBLY

BACKGROUND OF THE INVENTION

Various types of store racks for releasably attaching stores, such as bombs, rockets, cameras, parachutes, ejection seats and the like, to aircraft have been used in the past. Two of such devices are disclosed in U.S. Pat. No. 3,268,188 entitled STORE CARRIER with sway BRACED LUG by Emmett T. LaRoe, et al and co-pending U.S. Pat. No. 3,598,341, entitled AIRCRAFT STORE CARRIER, by Emmett T. LaRoe et al. The hook assembly of the present device can be used as a replacement for the hook assemblies described in the two above patents as well as others and is an improvement thereto.

The prior art store rack hook assemblies usually include hook locks of the toggle or sear type to prevent inadvertant store release. Such locks and their associated hooks require careful design control and precisely machined components or they do not operate properly. They also have a tendency to wear to an unsafe condition if not regularly inspected, an operation which is likely to be neglected in the heat of combat. In addition, the known hooks do not always positively lock when a store is installed in the rack. This presents a severe safety problem since improper locking of the hooks can cause either premature store release or overstressing, bending and/or breakage of the rack which may cause the store to "hang up." Also, certain hook assemblies are designed with a hook having a single support pivot and control linkage which, due to leverage effects, causes more load to be supported by the pivot than is generated by the attached store. The extra unnecessary load makes the use of stronger hooks and pivots manditory and such stronger hooks and pivots are usually much heavier than is desirable.

SUMMARY OF THE INVENTION

The present store rack lock assembly which is designed to safely retain and release the support lug for a droppable or ejectable store on command, solves the deficiencies of the previously known store rack hook assemblies. It assures positive hook latching with a large tolerance allowance for proper positioning of the store on the hook. Also no unusual or critical machining techniques are required to construct the present hook assembly which includes no toggles, sears, or other close tolerance components. In addition, the load on each hook created by the droppable store is split relatively equally and transferred to the store rack by the pivot pin and the locking device for the store rack hook without generating any substantial leverage induced forces. Therefore, the present assembly can be constructed substantially lighter than the heretofore known hook assemblies.

The locking device for the present assembly includes a cam follower, a cam follower pin which connects the cam follower to the hook, a cam in which the cam follower rides and a cam pivot pin which connects the cam for rotation to the store rack. It is through the cam pivot pin that the locking device's proportionate share of the load of the store is distributed to the bomb rack. The cam pivot pin is slightly eccentric to the cam follower pin and the amount of eccentricity employed determines the point at which the hook becomes self-energizing; that is, the point where the friction induced by the store load between the cam and the cam follower is overcome by the change in ramp angle of the cam as the cam is rotated about the cam pivot pin to its unlocked position. A release rod is connected to the cam to rotate the cam about the cam pivot pin to a locked position when a store is being loaded and to the self-energizing position when the store is being released. The release rod is usually activated by power derived from the store ejector system of the store rack when the store is being released.

It is therefore an object of the present invention to provide a store rack hook assembly which requires low release forces for large hook loads.

Another object of the present invention is to eliminate the need for exact positioning of components in a store rack hook assembly to achieve positive locking thereof.

Another object of the present invention is to provide a store rack hook assembly which requires no extraordinary machining tolerances and is therefore, relatively economical to manufacture.

Another object of the present invention is to provide a store rack hook assembly which is quick and easy to load.

Another object of the present invention is to provide a store rack hook assembly which when loaded, snaps into its locked position to assure the positive locking of the store to the rack.

Another object of the present invention is to provide a store rack hook assembly which is adaptable for use in various types of store racks.

Another object of the present invention is to provide a store rack hook which distributes the load of the store thereon relatively equally between two support points.

These and other objects and advantages of the present invention will become apparent after considering the following detailed specification which discloses a preferred embodiment of the present invention in conjunction with the accompanying drawing wherein:

BRIEF DESCRIPTION OF THE DRAWING

FIG. 1 is a side view of a store rack hook assembly constructed according to the present invention in a locked condition;

FIG. 2 is a side view of the hook assembly of FIG. 1 with the cam thereof rotated to the self-energizing position;

FIG. 3 is a side view of the hook assembly of FIG. 1 with its hook in a partially released position; and FIG. 4 is a side view of the hook assembly of FIG. 1 with its hook in the fully released position.

DESCRIPTION OF THE PRESENT EMBODIMENT

Referring to the drawing more particularly by reference numbers, number 10 in FIG. 1 refers to a store rack which includes a store rack housing 12 to which one or more store rack hook assemblies 14 are usually connected.

Each store rack hook assembly 14 includes a hook 16 which is connected for rotation to the store rack housing 12 by a hook pivot pin 18. The hook 16 includes a long upper arm 20 and a short store carrying arm 22 with a central portion 24 therebetween so that the hook 16 takes the shape of a letter J which in the mounted position is laying on its side. The arm 22 forms the attachment means which connects the store 25 to the rack 10 by engaging a lug 26 on the store. The hook 16 is supported by the pivot pin 18 at the juncture between the long arm 20 and the central portion 24 and by a cam follower pin 27 at the opposite end of the long arm 20. The cam follower pin 27 pivotally attaches a cam follower 28 to the hook 16. The cam follower 28 is positioned within a generally linear slot 30 of a cam 32. The cam 32 is connected for rotation to the store rack housing 12 by means of a cam pivot pin 34 which is slightly eccentric to the location of the cam follower pin 27 when the assembly 14 is in its locked condition as shown in FIG. 1 with the cam slot 30 generally perpendicular to the direction of release or ejection of the store 25. The direction of release is indicated by the arrow 35. With the cam 32 in this aforesaid locked position, the load applied to the short arm 22 of the hook 16 by the store 25 and its associated lug 26 is distributed to the store rack housing 12 relatively equally by the hook pivot pin 18 and the cam pivot pin 34.

The eccentricity between the cam follower pin 27 and the cam pivot pin 34 and the generally vertical alignment therebetween cause the forces between the hook 16 and the cam 32 to act in a generally vertical direction so that there is no appreciable moment exerted on the cam 32 about the cam pivot pin 34 to cause the cam 32 to rotate to a hook releasing position no matter how high the load exerted on the hook 16 by the store 25 becomes. Nevertheless, to assure that the cam 32 will not undesirably rotate, it is maintained in position by a biased release rod 36 pivotally connected thereto by pivot pin 38. As shown in FIG. 1, the release rod 36 is biased to the right by means such as a tension spring 40 connected between the release rod 36 and the store rack housing 12. The force exerted on the cam 32 by the release rod 36 normally prevents the cam 32 from rotating in a counterclockwise manner about the cam pivot pin 34 while abutment means are included to prevent further rotation of the cam 32 in a clockwise direction. The abutment means may be provided in any suitable manner and in FIG. 1 they are shown as being an abutment surface 42 on an intermediate portion of the release rod 36 and a mating abutment surface 44 on the side of the cam 32.

When it is desired to release the store 25 from the hook 16, the release rod 36 is moved to the left against the tension of the spring 40. Since the release rod 36 must only overcome the tension of the spring 40, which need not be exceptionally large, the release forces that must be exerted on the release rod 36 are relatively light. This is because none of the load exerted by the store 25 on the assembly 14 is transferred to the release rod 36 when the assembly 14 is in its locked position.

The means to move the release rod can be provided by a simple mechanical linkage or by means associated with the store ejection mechanism of the rack 10. To cause the release of the store, the release rod 36 is moved to the left, thereby rotating the cam 32 counterclockwise about the cam pivot pin 34 until the cam 32 reaches its self-energizing position. The approximate self-energizing position is shown in FIG. 2, where the ramp angle between the slot 30 and the force applied by the hook 16 through the cam follower 28 is sufficient to overcome the sliding friction between the cam follower 28 and the slot 30 and the light bias of the spring 40. From the position shown in FIG. 2, the weight of the store 25 or the ejective force applied thereto is sufficient to further rotate the cam 32 in a counterclockwise direction, thus allowing the hook 16 to rotate about pivot 18 to release the store 25. This is shown in FIG. 3. The rotation of the cam 32 continues until the hook 16 reaches the position shown in FIG. 4 wherein the store 25 has been released by the hook 16 and the hook has rotated counterclockwise about pivot 18 and an abutment surface 46 of the hook 16 has engaged an abutment member 48 connected to the store rack housing 12 to restrict further rotation of the hook 16. The abutment member 48 maybe a specially placed hook stop or merely a structural portion of the store rack housing 12.

When the hook 16 and the cam 32 have rotated to the positions shown in FIG. 4, the assembly 14 is in its unlocked or open condition and the assembly 14 tends to remain in that open condition thereafter. This is because the hook 16 cannot rotate clockwise into its locked position unless the cam 32 also rotates clockwise and this cannot occur because the release rod 36 acts in an overcenter manner. The overcenter action is generated by means of the force applied to the release rod 36 by spring 40 and the relative positioning of the rod 36, the rod pivot pin 38 and the cam pivot pin 34 which cause the spring force to bias the cam in a counterclockwise direction when the assembly 14 is in its open condition. Of course the cam 32 cannot move in a counterclockwise direction because to do so would require that the hook 16 also rotate in a counterclockwise direction which is impossible due to the action of the abutment member 48 thereagainst.

When installing a store in the present hook assembly 14, the store 25 is lifted until its lug 26 contacts a central portion 50 of the long arm 20 of the hook 16. The portion 50 is adapted for abutment against the top of the lug 26 and the further raising of the lug 26 thereafter causes the hook 16 to rotate clockwise about pivot pin 18. When the overcenter action established by the release rod 36 and the cam pivot pin 34 is overcome by the movement of the hook 16 in the clockwise direction, the cam 32 and the hook 16 snap to the position shown in FIG. 1 locking the lug 26 and its attached store 25 into the rack 10. It therefore can be seen that there are only two stable positions of the hook assembly 14; that is, a locked position and an unlocked position and therefore it is impossible for the assembly 14 to assume a partially locked and potentially very dangerous position.

The assembly 14 is also adaptable to multiple use; that is, the use of more than one assembly 14 to hold a store 25 by more than one lug 26. When this is done the release rods 36 of the assemblies 14 are interconnected so that the two or more hooks 16 then employed in the rack 10 must be closed or opened in unison. This alleviates the problem of having a store rack with multiple hooks, one or more of which may be in an unlocked condition thus causing a store to exert more than the desired load on the remaining locked hooks.

Thus there has been shown and described a novel store rack hook assembly which fulfills all of the objects and advantages sought therefor. Many changes, alterations, and other modifications of the subject assembly and many different uses therefor will become apparent to those skilled in the art after considering this specification and the accompanying drawing. All such changes, alterations, uses and modifications which do not depart from the spirit and scope of the invention are deemed to be covered by the invention which is limited only by the claims which follow.

What is claimed is:

1. A store carrier hook assembly for retaining and releasing a store, said assembly comprising:

a hook including a short arm, a long arm generally parallel and in spaced juxtaposed relationship to said short arm, and a central body portion therebetween, said short arm being adapted to engage the store;

a hook pivot for supporting and allowing rotation of said hook, said hook pivot being located at the juncture between said long arm and said central body portion; and releasable support means connected to said long arm for controlling rotation of said hook about said hook pivot, said releasable support means including a cam follower connected to said long arm of said hook and a cam having at least one cam surface on which said cam follower rides and cam pivot means eccentric to said cam follower, whereby said cam rotated to a position placing its cam surface generally parallel to said long arm, restricts motion of said hook, said cam allowing store releasing movement of said hook when its cam surface is rotated away from the generally parallel position to said long arm.

2. The assembly defined in claim 1 wherein said cam has two stable positions, said assembly including:

release linkage connected to said cam to control rotation thereof about said cam pivot means; and bias means connected to said release linkage for biasing said cam into one of the two stable positions thereof.

3. The assembly defined in claim 2 wherein said cam includes:

an abutment surface adapted to engage said release linkage to restrict rotation of said cam about said hook pivot.

4. A store carrier hook assembly for engaging a store and for releasing the store in a predetermined direction, said assembly comprising:

a store hook adapted to engage the store;

a hook pivot for supporting and allowing rotation of said hook for releasing and engaging the store; and support means connected to said store hook for controlling rotation of said hook about said hook pivot, said support means including, a cam follower connected to said store hook in spaced relationship to said hook pivot, a cam on which said cam follower rides, and a cam pivot for supporting said cam and allowing rotation thereof.

5. The assembly defined in claim 4 wherein said cam includes:

two parallel spaced cam surfaces between which said cam follower is retained.

6. The assembly defined in claim 5 wherein said cam surfaces are plane surfaces.

7. The assembly defined in claim 4 wherein said cam includes:

a cam slot in which said cam follower is retained, the cam slot being positioned on said cam so that said cam slot faces generally radially outward from said hook pivot when said hook is in a store retaining position.

8. The assembly defined in claim 4 wherein said cam follower is positioned eccentric to said cam pivot.

9. The assembly defined in claim 4 including:
   release linkage connected to said cam to control rotation thereof about said cam pivot; and
   bias means operatively connected to said cam, said bias means providing overcenter means for said cam which tend to maintain said cam in one of two stable positions.

10. The assembly defined in claim 9 wherein said cam includes:
    an abutment surface adapted to engage said release linkage to restrict rotation of said cam about said cam pivot and to establish one of said stable positions thereof.

11. The assembly defined in claim 9 wherein said assembly includes:
    abutment means for engaging a portion of said store hook to restrict rotation of said store hook about said hook pivot thereby restricting rotation of said cam about said cam pivot and establishing one of said stable positions of said cam.

12. The assembly defined in claim 9 wherein said store hook includes:
    abutment adapted to engage the store as the store is being positioned for engagement with said assembly, whereby engagement and movement of the store in a direction opposite to the store release direction after engagement with said abutment means causes said store hook to rotate about said hook pivot, and by means of said cam follower thereby causing said cam to rotate about said cam pivot which in turn causes said cam to move from one of said stable positions thereof to said other position.

13. The assembly defined in claim 4 wherein said store hook is adapted to engage said store at a position thereon between said hook pivot and said support means connections, whereby the load applied to the store hook by the store is distributed relatively equally between said hook pivot and said support means.

* * * * *